US012027798B2

(12) United States Patent
Huang et al.

(10) Patent No.: US 12,027,798 B2
(45) Date of Patent: Jul. 2, 2024

(54) ANGLE CONNECTOR

(71) Applicant: Advanced Connectek Inc., New Taipei (TW)

(72) Inventors: Sheng-Hsiang Huang, New Taipei (TW); Yu Feng Ke, New Taipei (TW)

(73) Assignee: Advanced Connectek Inc., New Taipei (TW)

( * ) Notice: Subject to any disclaimer, the term of this patent is extended or adjusted under 35 U.S.C. 154(b) by 178 days.

(21) Appl. No.: 17/717,113

(22) Filed: Apr. 10, 2022

(65) Prior Publication Data

US 2022/0329004 A1 Oct. 13, 2022

(30) Foreign Application Priority Data

Apr. 12, 2021 (TW) ................................ 110203922

(51) Int. Cl.
*H01R 13/58* (2006.01)

(52) U.S. Cl.
CPC ..... *H01R 13/5841* (2013.01); *H01R 2201/26* (2013.01)

(58) Field of Classification Search
CPC ............ H01R 13/5841; H01R 2201/26; H01R 13/415; H01R 13/65912; H01R 24/00; H01R 2107/00; H01R 13/567; H01R 13/02; H01R 13/40; H01R 13/502
See application file for complete search history.

(56) References Cited

U.S. PATENT DOCUMENTS

| | | | | |
|---|---|---|---|---|
| 6,817,899 B1 * | 11/2004 | Zerebilov | ............ | H01R 9/0524 439/585 |
| 9,130,295 B2 * | 9/2015 | Nguyen Nhu | ....... | H01R 13/501 |
| 10,014,619 B2 * | 7/2018 | Haspel | .................. | H01R 13/42 |

* cited by examiner

*Primary Examiner* — Briggitte R. Hammond
(74) *Attorney, Agent, or Firm* — JCIPRNET

(57) ABSTRACT

An angle connector, including an angle holder, a cable, and multiple contacts, is provided. The angle holder includes a first receiving portion, a second receiving portion, and a first bending portion connected therebetween. Each of the first receiving portion and the second receiving portion has multiple receiving grooves. The cable includes multiple core wires. Each of the contacts includes a first connecting portion, a second connecting portion, and a second bending portion connected therebetween. The first connecting portions for electrically connecting to another electrical connector are embedded in the receiving grooves of the first receiving portion. The second connecting portions electrically connected to the core wires are embedded in the receiving grooves of the second receiving portion.

15 Claims, 6 Drawing Sheets

ANGLE CONNECTOR

CROSS-REFERENCE TO RELATED APPLICATION

This application claims the priority benefit of Taiwan application serial no. 110203922, filed on Apr. 12, 2021. The entirety of the above-mentioned patent application is hereby incorporated by reference herein and made a part of this specification.

BACKGROUND

Technical Field

The disclosure relates to an angle connector.

Description of Related Art

In the past, connectors configured to connect cables to a printed circuit board (PCB) were standardized according to various systems. In automotive technology, a system called Fachkreis Automobiltechnik (FAKRA) adopted as a standard in Europe and the United States is known. The FAKRA is the Automotive Standards Committee (Normenausschuss Kraftfahrzeuge) of the German Standards Association, which represents international standardization concerns in the automotive field. The standard promoted by the FAKRA is named as the FAKRA standard, which is the name of the organization that adopts the developed standard system. Generally, in automotive applications, the same is mostly used for GPS, AM/FM radios, mobile phones, airbag systems, multimedia devices, etc.

In the structure of the existing electrical connector conforming to the FAKRA standard, due to the complexity of the structure and the material of the components, the manufacturing process cannot be smoothly simplified, so the costs cannot be reduced.

For example, generally, for an angle connector that needs to be bent by 90 degrees, it is usually necessary to combine the contacts and the core wires into semi-finished products, bend the semi-finished products one by one by 90 degrees, and then assemble the bent semi-finished products into corresponding bodies or casings. However, since the contacts and the core wires are all small objects, during the combining process or the bending process, situations such as defective size or even deformation may easily occur due to object movement, collision, etc. In order to solve the issues, more costs are inevitably spent on corresponding manufacturing equipment.

Accordingly, how to simplify the structure and the manufacturing process to effectively reduce the manufacturing costs has become a topic for persons skilled in the art to ponder and solve.

SUMMARY

The disclosure provides an angle connector, which has a structure where an angle holder and contacts correspond to each other, so as to effectively improve the manufacturing yield and reduce the costs due to the simplified structure.

The angle connector of the disclosure includes an angle holder, a cable, and multiple contacts. The angle holder has a first bending portion, a first receiving portion, and a second receiving portion, and the first bending portion is connected between the first receiving portion and the second receiving portion. Each of the first receiving portion and the second receiving portion has multiple receiving grooves. The cable has multiple core wires. Each of the contacts has a second bending portion, a first connecting portion, and a second connecting portion, and the second bending portion is connected between the first connecting portion and the second connecting portion. The first connecting portions of the contacts are embedded in the receiving grooves of the first receiving portion, and the second connecting portions are embedded in the receiving grooves of the second receiving portion. The first connecting portions are configured to electrically connect to another electrical connector, and the second connecting portions are electrically connected to the core wires.

In an embodiment of the disclosure, the receiving grooves of the first receiving portion and the receiving grooves of the second receiving portion are equal in number and have a one-to-one correspondence with each other.

In an embodiment of the disclosure, the first bending portion and the second bending portions are a structure with one-time bending in the same direction.

In an embodiment of the disclosure, the first bending portion separates and layers the second bending portions.

In an embodiment of the disclosure, the second bending portions located on the same layer have the same curvature.

In an embodiment of the disclosure, lengths of the second bending portions located on an outer layer are greater than lengths of the second bending portions located on an inner layer.

In an embodiment of the disclosure, the first bending portion has a necking structure.

In an embodiment of the disclosure, the second connecting portions are riveted to the core wires.

In an embodiment of the disclosure, a material of the angle holder is thermoplastic.

In an embodiment of the disclosure, the angle holder also has multiple stopping portions, which are located in the first receiving portion and are adjacent to the first bending portion. The first connecting portions of the contacts abut against the stopping portions. When bending the first bending portion, the stopping portions stop the first connecting portions from moving toward the second receiving portion.

In an embodiment of the disclosure, each of the receiving grooves has an indented opening facing outward to buckle the first connecting portion or the second connecting portion of the contact.

In an embodiment of the disclosure, the angle connector is an electrical angle connector conforming to a Fachkreis Automobiltechnik (FAKRA) standard.

In an embodiment of the disclosure, the angle connector further includes an angled metal casing, an insulator, and a crimping member. The contacts embedded in the angle holder are installed in the angled metal casing. The angled metal casing is installed in the insulator. The crimping member circumferentially crimps a portion of the cable and the angle holder.

In an embodiment of the disclosure, the crimping member has a shielding piece, which is assembled to the angled metal casing to cover the angle holder and the contacts in the angled metal casing.

In an embodiment of the disclosure, a thickness of the first bending portion is less than a thickness of the first receiving portion, and a thickness of the first bending portion is less than a thickness of the second receiving portion.

Based on the above, the angle connector has a structure where the angle holder and the contacts correspond to each other, so that the angle holder and the contacts may be assembled first and then bent together. In other words, the first connecting portions, the second bending portions, and the second connecting portions of the contacts correspond to or are assembled in the first receiving portion, the first bending portion, and the second receiving portion of the angle holder, so that the pre-assembled angle holder and contacts only need one-time bending to ensure that the required bending can be generated at the first bending portion and the second bending portions, so as to prevent complicated respective bending of contacts, thereby effectively improving the processing yield and reducing the costs.

DETAILED DESCRIPTION OF DISCLOSED EMBODIMENTS

Figure 1:
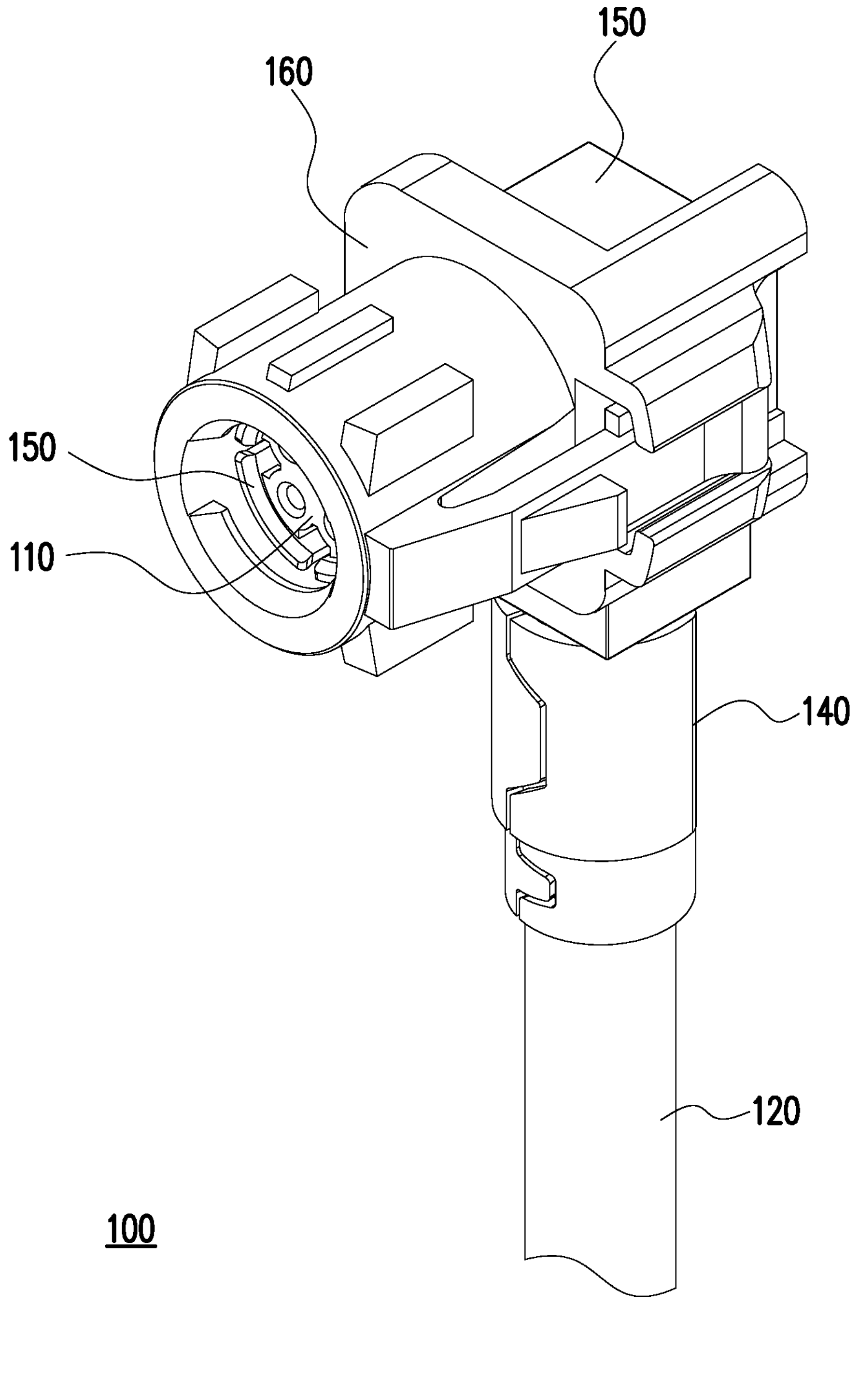
FIG. 1 is a schematic view of an angle connector according to an embodiment of the disclosure.
Figure 2:
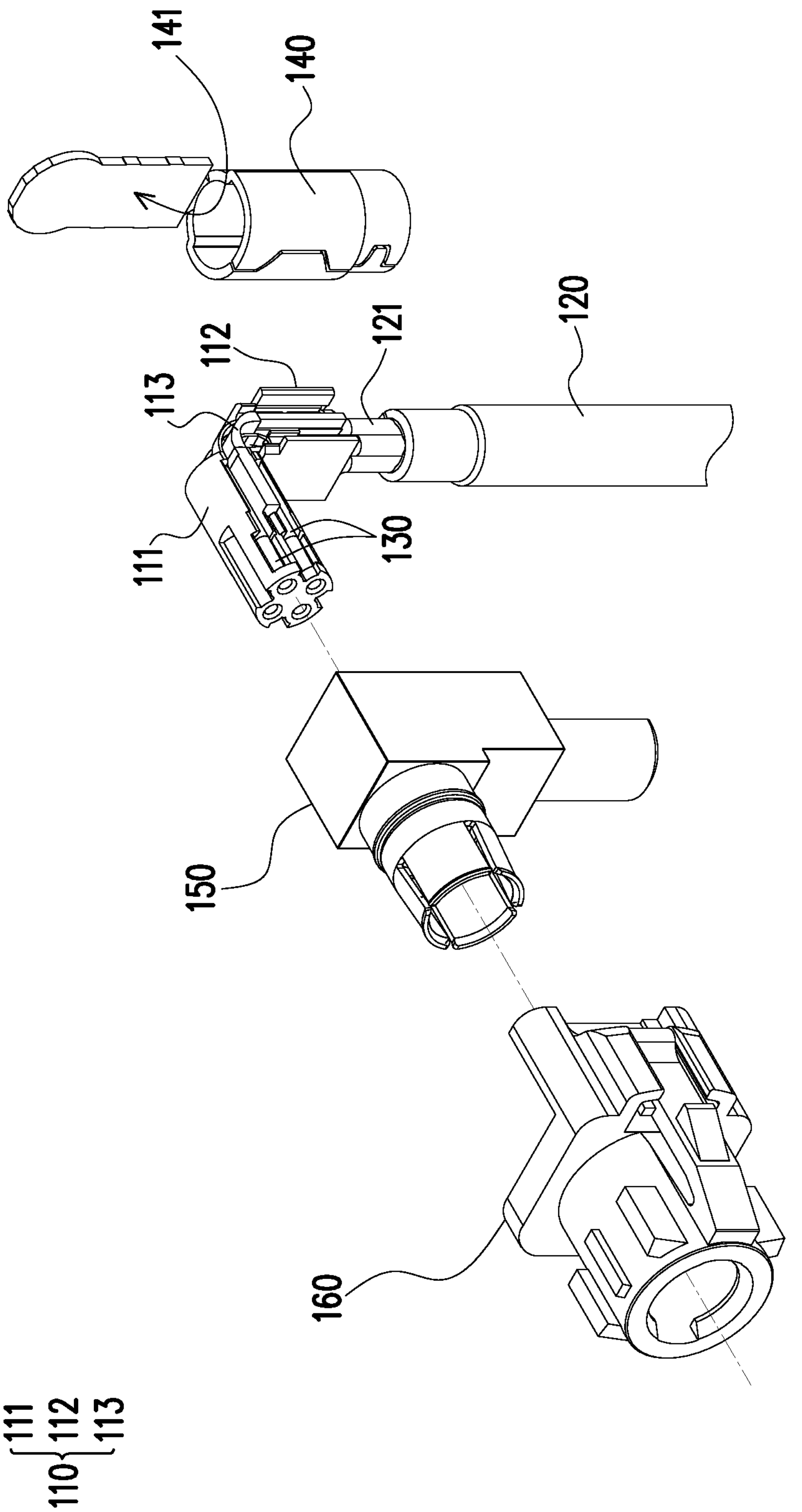
FIG. 2 is an exploded view of the angle connector of FIG. 1.
Figure 3:
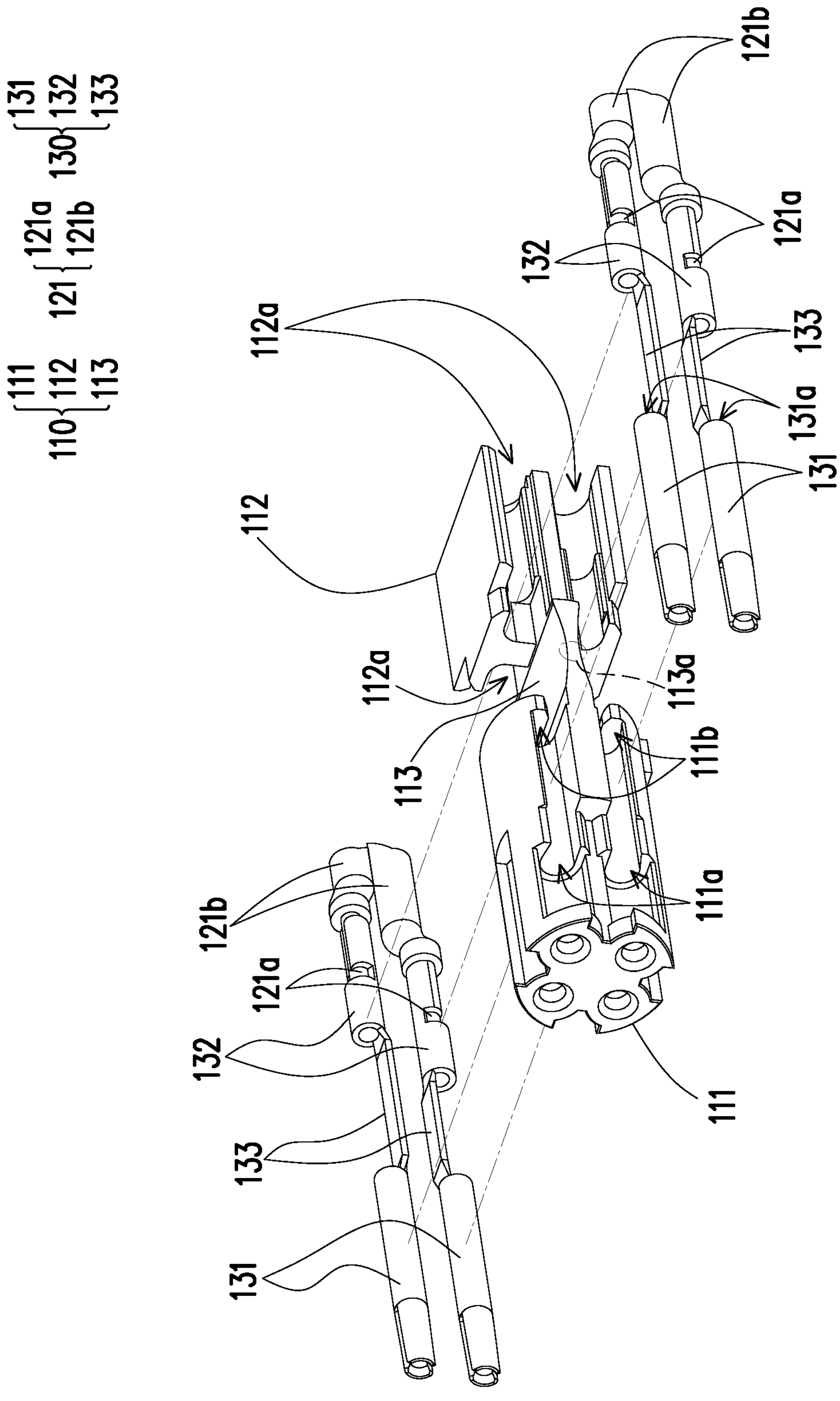
FIG. 3 is a schematic view of an assembly of an angle holder and contacts of FIG. 1.

FIG. 1 is a schematic view of an angle connector according to an embodiment of the disclosure. FIG. 2 is an exploded view of the angle connector of FIG. 1. FIG. 3 is a schematic view of an assembly of an angle holder and contacts of FIG. 1. Please refer to FIG. 1 to FIG. 3 at the same time. Here, an angle connector 100 is exemplified as an electrical angle connector conforming to the Fachkreis Automobiltechnik (FAKRA) standard and includes an angle holder 110, a cable 120, and multiple contacts 130. The angle holder 110 has a first bending portion 113, a first receiving portion 111, and a second receiving portion 112. An angle between a direction of the first bending portion 113 and a direction of the second receiving portion 112 is typically 90°. However, other angles including lager angles are possible. The first bending portion 113 is connected between the first receiving portion 111 and the second receiving portion 112 to form the angle. Each of the first receiving portion 111 and the second receiving portion 112 has multiple receiving grooves 111*a* and 112*a*. The cable 120 has multiple core wires 121. Each of the contacts 130 has a second bending portion 133, a first connecting portion 131, and a second connecting portion 132. The second bending portion 133 is connected between the first connecting portion 131 and the second connecting portion 132. The first connecting portions 131 of the contacts 130 are embedded in the receiving groove 111*a* of the first receiving portion 111, and the second connecting portions 132 are embedded in the receiving groove 112*a* of the second receiving portion 112. Here, the first connecting portions 131 are configured to electrically connect to another electrical connector (not shown), and the second connecting portions 132 are electrically connected to the core wires 121.

As shown in FIG. 2, the angle connector 100 also includes an angled metal casing 150, an insulator 160, and a crimping member 140. The contacts 130 embedded in the angle holder 110 are installed in the angled metal casing 150 along with the angle holder 110, and the angled metal casing 150 is then installed in the insulator 160. The crimping member 140 is a stamped metal flat plate before being processed, which then crimps a portion of the cable 120 and the angle holder 110 in a closed and circumferential manner. Furthermore, the crimping member 140 has a shielding piece 141, which is assembled to the angled metal casing 150 along with the crimping member 140 to cover the angle holder 110 and the contacts 130 in the angled metal casing 150.

Figure 4:
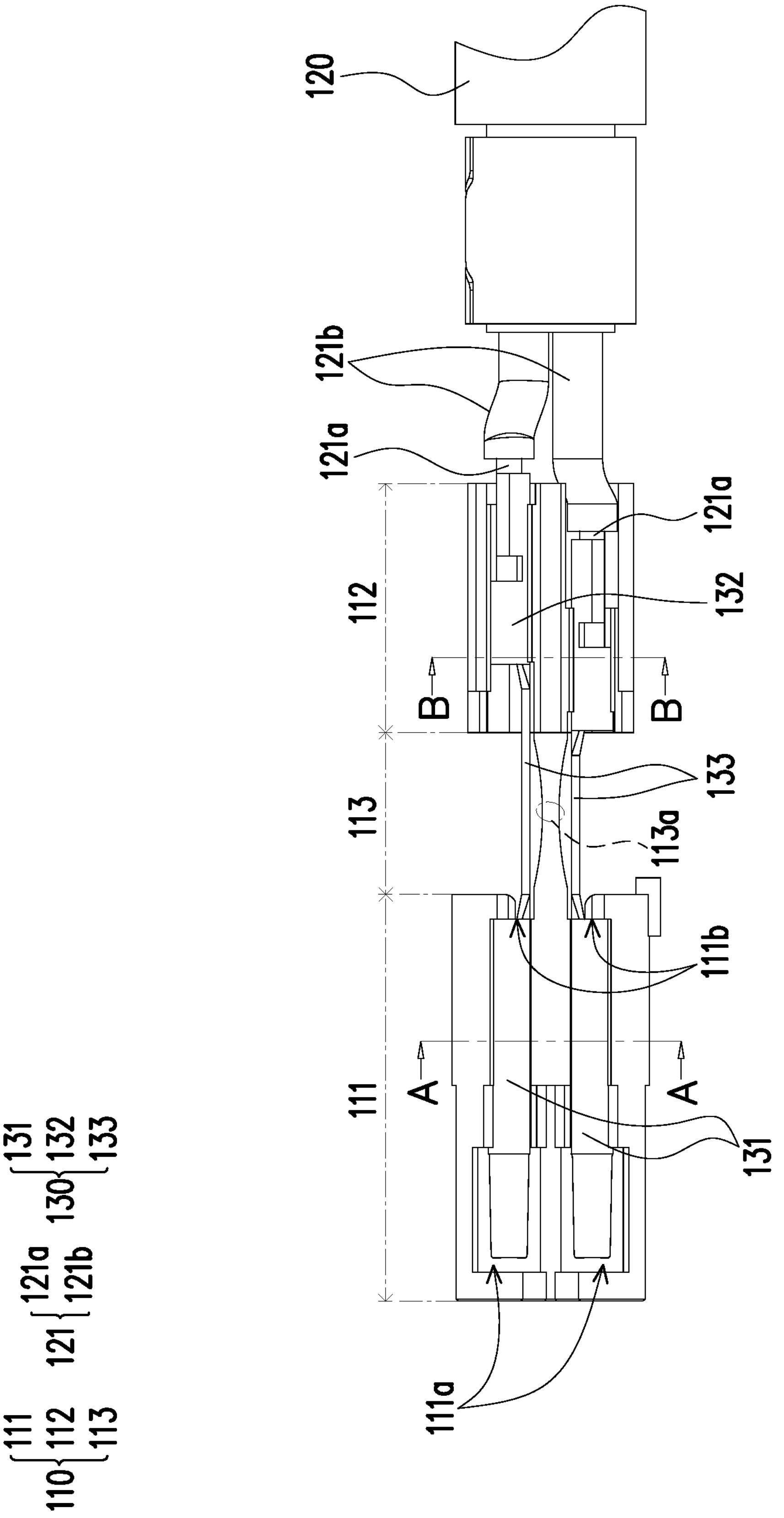
FIG. 4 is a side view of the assembled angle holder and contacts.
Figure 5:
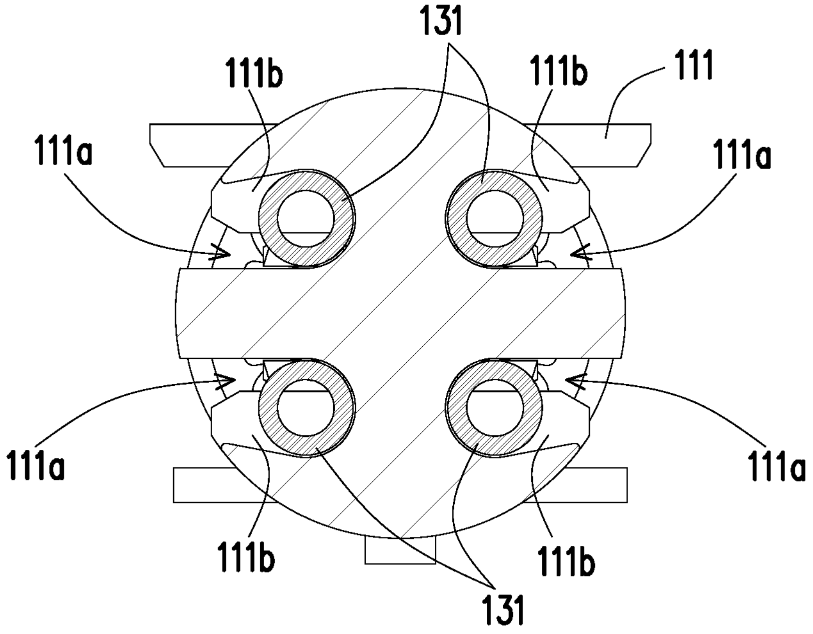
FIG. 5 is a cross-sectional view of FIG. 4 taken along a section line A-A.
Figure 6:
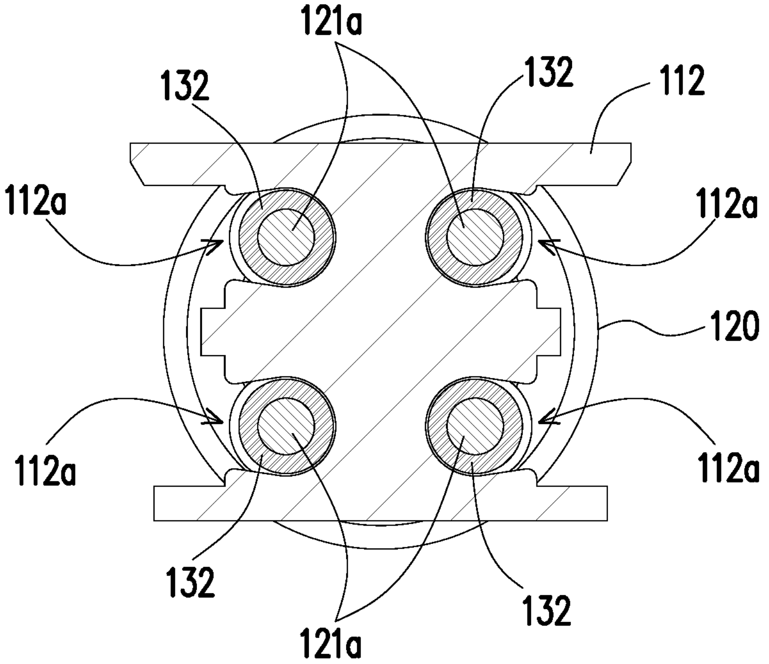
FIG. 6 is a side view of FIG. 4 taken along a section line B-B.

The following describes the manufacturing process of the angle holder 110 and the contacts 130 therein shown in FIG. 2 step by step. FIG. 4 is a side view of the assembled angle holder and contacts. FIG. 5 is a cross-sectional view of FIG. 4 taken along a section line A-A. FIG. 6 is a side view of FIG. 4 taken along a section line B-B.

Please refer to FIG. 3 and FIG. 4. First, as shown in FIG. 3, the cable 120 needs to combine the core wires 121 and the contacts 130 one-to-one. Here, an insulating portion 121*b* of the core wire 121 needs to be removed to expose a conductive portion 121*a*, and the second connecting portion 132 of the contact 130 and the conductive portion 121*a* of the core wire 121 are riveted together. Then, as shown in the assembly line of FIG. 3, the assembled core wire 121 and contact 130 are inserted into the multiple receiving grooves 111*a* and 112*a* of the first receiving portion 111 and the second receiving portion 112 of the angle holder 110 along a lateral direction. That is, the first connecting portion 131 is embedded in the receiving groove 111*a* of the first receiving portion 111 and the second connecting portion 132 is embedded in the receiving groove 112*a* of the second receiving portion 112. Here, the multiple receiving grooves 111*a* of the first receiving portion 111 and the multiple receiving grooves 112*a* of the second receiving portion 112 are equal in number and have a one-to-one correspondence, so that the receiving grooves 111*a* and 111*b* into which the first connecting portions 131 and the second connecting portions 132 of the same contacts 130 are respectively embedded are in a corresponding state to each other. Furthermore, please refer to FIG. 5 and FIG. 6. It can be seen that the receiving grooves 111*a* and 111*b* respectively have indented openings facing outward and the material of the angle holder 110 is thermoplastic, especially nylon 66 (PA 66), so as to be able to smoothly buckle the first connecting portion 131 or the second connecting portion 132 of each of the contacts 130.

Figure 7:
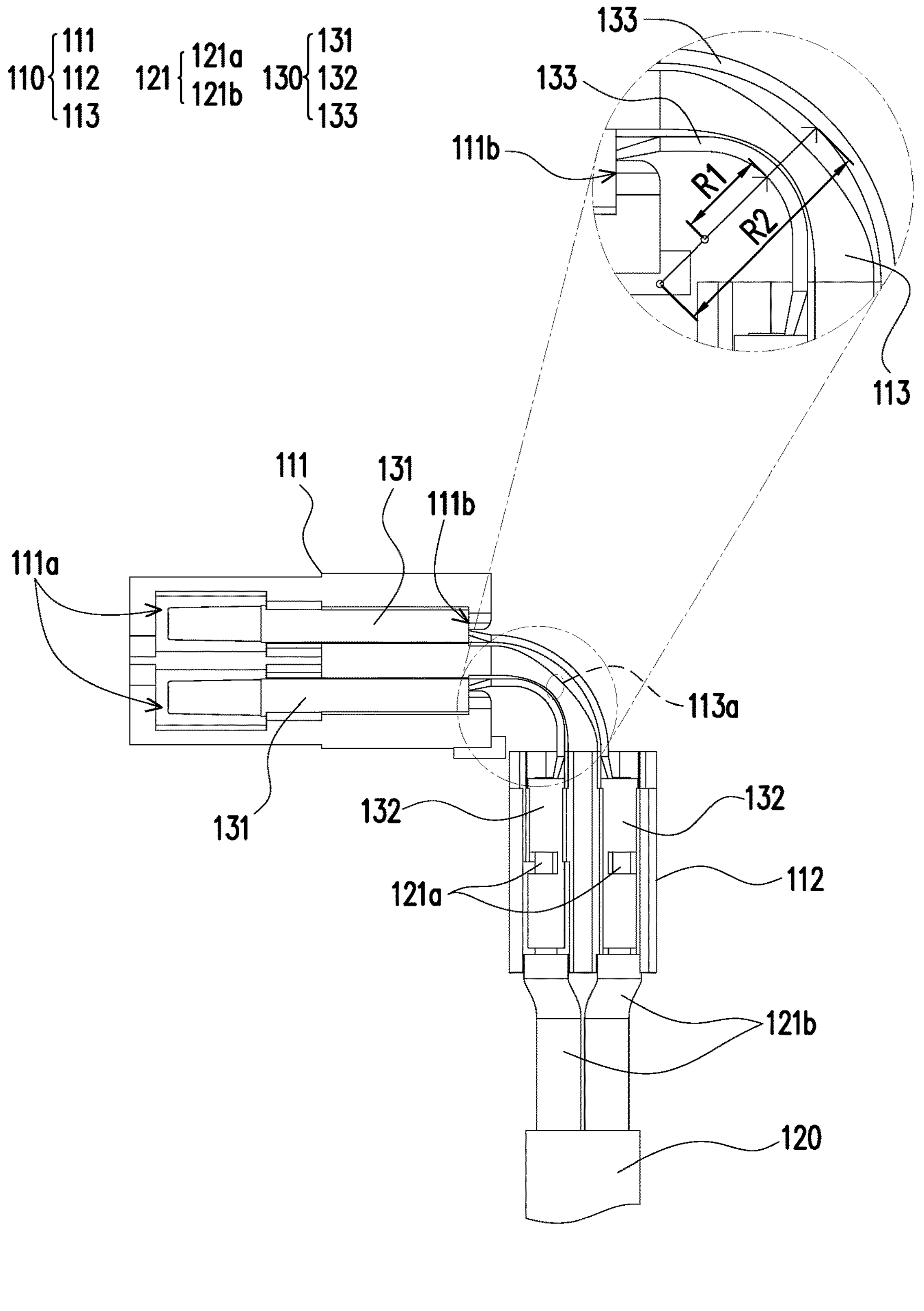
FIG. 7 is a side view of the angle holder and the contacts of FIG. 4 after being bent.

FIG. 7 is a side view of the angle holder and the contacts of FIG. 4 after being bent. Next, please refer to FIG. 4 and FIG. 7 at the same time. After completing the assembly, the contacts 130 and the angle holder 110 may be synchronously bent. Here, since the first connecting portion 131, the second bending portion 133, and the second connecting portion 132 of the contact 130 correspond to the first receiving portion 111, the first bending portion 113, and the second receiving portion 112 of the angle holder 110, the same may be bent, so that the contacts 130 and the angle holder 110 shown in FIG. 7 are a structure with one-time bending in the same direction.

In detail, the angle holder 110 of this embodiment also has multiple stopping portions 111*b*, which are located in the first receiving portion 111 and are adjacent to the first bending portion 113, so that the first connecting portions 131 of the contacts 130 abut against the stopping portions 111*b*. When the first bending portion 113 is formed by bending, the stopping portions 111*b* can effectively stop the first connecting portions 131 from moving toward the second receiving portion 112 to effectively prevent the first connecting portions 131 from detaching from the first receiving portion 111 during the bending process.

Furthermore, as shown in FIG. 4, the first bending portion 113 of the angle holder 110 of this embodiment can effectively separate and layer the second bending portions 133 of the contacts 130, so as to prevent electrical short circuit due to the second bending portions of the contacts 130 contacting each other during the bending process while providing a shielding effect to the contacts 130 to prevent mutual interference of signals between the contacts 130. Also, the separation effect generated by the first bending portion 113 enables the second bending portions 133 on the same layer to have the same curvature. As shown in FIG. 7 (and with reference to FIG. 4 to FIG. 6), the two second bending portions 133 located on an inner layer have a same radius of curvature R1, and the two second bending portions 133 located on an outer layer have a same radius of curvature R2, where the radius of curvature R2 is greater than the radius of curvature R1.

At the same time, since the angle holder 110 and the contacts 130 are bent in the manner shown in FIG. 7, it can be clearly seen in FIG. 4 that lengths of the second bending portions 133 on the outer layer are greater than lengths of the second bending portions 133 on the inner layer. More importantly, the first bending portion 113 of this embodiment has a necking structure 113*a*, which limits the position where the bending occurs by weakening the structure, so as to ensure that the angle holder 110 is bent at the thinnest place of the first bending portion 113 during the bending process, so that the bending is not unpredictable. For the angle holder 110, a thickness of the first bending portion 113 is less than a thickness of the first receiving portion 111, and a thickness of the first bending portion 113 is less than a thickness of the second receiving portion 112, which also ensures that the bending occurs at the first bending portion 113.

In summary, in the embodiment of the disclosure, the angle connector has a structure where the angle holder and the contacts correspond to each other, so that the angle holder and the contacts may be assembled first and then bent together. In other words, the first connecting portions, the second bending portions, and the second connecting portions of the contacts correspond to or are assembled in the first receiving portion, the first bending portion, and the second receiving portion of the angle holder, so that the pre-assembled angle holder and contacts only need one-time bending to ensure that the required bending can be generated at the first bending portion and the second bending portions, so as to prevent complicated respective bending of contacts, thereby effectively improving the processing yield and reducing the costs.

What is claimed is:

1. An angle connector, comprising:

an angle holder, having a first bending portion, a first receiving portion, and a second receiving portion, wherein the first bending portion is connected between the first receiving portion and the second receiving portion, and each of the first receiving portion and the second receiving portion has a plurality of receiving grooves; and a plurality of contacts, wherein each of the contacts has a second bending portion, a first connecting portion, and a second connecting portion, the second bending portion is connected between the first connecting portion and the second connecting portion, the first connecting portions of the contacts are respectively inserted in the receiving grooves of the first receiving portion, the second connecting portions are respectively inserted in the receiving grooves of the second receiving portion, the first connecting portions are configured to electrically connect to another electrical connector, and the second connecting portions are electrically connected to a plurality of core wires of a cable.

2. The angle connector according to claim 1, wherein the receiving grooves of the first receiving portion and the receiving grooves of the second receiving portion are equal in number and have a one-to-one correspondence.

3. The angle connector according to claim 1, wherein the first bending portion and the second bending portions are a structure with one-time bending in a same direction.

4. The angle connector according to claim 3, wherein the first bending portion separates and layers the second bending portions.

5. The angle connector according to claim 4, wherein the second bending portions located on a same layer have a same curvature.

6. The angle connector according to claim 4, wherein lengths of the second bending portions located on an outer layer are greater than lengths of the second bending portions located on an inner layer.

7. The angle connector according to claim 1, wherein the first bending portion has a necking structure.

8. The angle connector according to claim 1, wherein the second connecting portions are riveted to the core wires.

9. The angle connector according to claim 1, wherein a material of the angle holder is thermoplastic.

10. The angle connector according to claim 1, wherein the angle holder further has a plurality of stopping portions located in the first receiving portion and adjacent to the first bending portion, the first connecting portions of the contacts abut against the stopping portions, and when bending the first bending portion, the stopping portions prevent the first connecting portions from moving toward the second receiving portion.

11. The angle connector according to claim 1, wherein each of the receiving grooves has an indented opening facing outward to buckle the first connecting portion or the second connecting portion.

12. The angle connector according to claim 1, wherein the angle connector is an electrical angle connector conforming to a Fachkreis Automobiltechnik (FAKRA) standard.

13. The angle connector according to claim 1, further comprising an angled metal casing, an insulator, and a crimping member, wherein the contacts inserted in the angle holder are installed in the angled metal casing along with the angle holder, the angled metal casing is installed in the insulator, and the crimping member circumferentially crimps a portion of the cable and the angle holder.

14. The angle connector according to claim 13, wherein the crimping member has a shielding piece assembled to the angled metal casing to cover the angle holder and the contacts in the angled metal casing.

15. The angle connector according to claim 1, wherein a thickness of the first bending portion is less than a thickness of the first receiving portion, and a thickness of the first bending portion is less than a thickness of the second receiving portion.

* * * * *